United States Patent
Collet et al.

(10) Patent No.: US 11,725,626 B2
(45) Date of Patent: Aug. 15, 2023

(54) METHOD AND SYSTEM FOR CONTROLLING A QUANTITY OF A WIND TURBINE BY CHOOSING THE CONTROLLER VIA MACHINE LEARNING

(71) Applicants: IFP Energies nouvelles, Rueil-Malmaison (FR); CENTRE NATIONAL DE LA RECHERCHE SCIENTIFIQUE, Paris (FR); UNIVERSITE GRENOBLE ALPES, Saint Martin d'Heres (FR); INSTITUT POLYTECHNIQUE DE GRENOBLE, Grenoble (FR)

(72) Inventors: David Collet, Rueil-Malmaison (FR); Guillaume Sabiron, Rueil-Malmaison (FR); Domenico Di Domenico, Rueil-Malmaison (FR); Mazen Al-Amir, Saint Martin d'Heres (FR)

(73) Assignees: IFP ENERGIES NOUVELLES, Rueil-Malmaison (FR); CENTRE NATIONAL DE LA RECHERCHE SCIENTIFIQUE, Paris (FR); UNIVERSITE GRENOBLE ALPES, Saint Martin d'Heres (FR); INSTITUT POLYTECHNIQUE DE GRENOBLE, Grenoble (FR)

( * ) Notice: Subject to any disclaimer, the term of this patent is extended or adjusted under 35 U.S.C. 154(b) by 136 days.

(21) Appl. No.: 17/603,389

(22) PCT Filed: Mar. 27, 2020

(86) PCT No.: PCT/EP2020/058739
§ 371 (c)(1),
(2) Date: Oct. 13, 2021

(87) PCT Pub. No.: WO2020/212119
PCT Pub. Date: Oct. 22, 2020

(65) Prior Publication Data
US 2022/0213868 A1 Jul. 7, 2022

(30) Foreign Application Priority Data
Apr. 16, 2019 (FR) .................................. 1904071

(51) Int. Cl.
*F03D 7/02* (2006.01)
*F03D 7/04* (2006.01)

(52) U.S. Cl.
CPC .......... *F03D 7/0224* (2013.01); *F03D 7/047* (2013.01); *F03D 7/0292* (2013.01);
(Continued)

(58) Field of Classification Search
CPC ...... F03D 7/0224; F03D 7/047; F03D 7/0292; F05B 2260/821; F05B 2260/84; F05B 2270/332
See application file for complete search history.

(56) References Cited

U.S. PATENT DOCUMENTS 9,458,826 B2    10/2016   Chauvin
9,683,552 B2 *   6/2017   Tiwari .................... F03D 7/046
(Continued)

FOREIGN PATENT DOCUMENTS

CN    107654336 A    2/2018
EP    3336349 A1     6/2018
(Continued)

OTHER PUBLICATIONS

International Search Report for PCT/EP2020/058739, dated May 28, 2020; 5 pages.

*Primary Examiner* — Pedro J Cuevas
(74) *Attorney, Agent, or Firm* — Fitch, Even, Tabin & Flannery LLP

(57) ABSTRACT

The present invention relates to a method of controlling a wind turbine by automatic online selection of a controller
(Continued)

that minimizes the wind turbine fatigue. The method therefore relies on an (offline constructed) database (BDD) of simulations of a list (LIST) of controllers, and on an online machine learning step for determining the optimal controller in terms of wind turbine (EOL) fatigue. Thus, the method allows automatic selection of controllers online, based on a fatigue criterion, and switching between the controllers according to the measured evolution of wind condition.

20 Claims, 1 Drawing Sheet

(52) U.S. Cl.
CPC ..... *F05B 2260/821* (2013.01); *F05B 2260/84* (2013.01); *F05B 2270/332* (2013.01); *F05B 2270/8042* (2013.01)

(56) References Cited

U.S. PATENT DOCUMENTS

| | | | |
|---|---|---|---|
| 9,702,345 B2 * | 7/2017 | Guadayol Roig | F03D 7/045 |
| 10,041,473 B2 | 8/2018 | Chauvin et al. | |
| 10,302,067 B2 * | 5/2019 | Herbsleb | F03D 7/022 |
| 10,683,844 B2 * | 6/2020 | Hammerum | F03D 7/0292 |
| 10,832,087 B1 * | 11/2020 | Wang | G06F 18/2163 |
| 11,060,504 B1 * | 7/2021 | Virani | G06N 3/08 |
| 2011/0115224 A1 | 5/2011 | Lausen | |
| 2014/0328678 A1 * | 11/2014 | Guadayol Roig | F03D 7/0224 416/43 |
| 2015/0252786 A1 * | 9/2015 | Tiwari | F03D 7/046 416/61 |
| 2015/0369214 A1 * | 12/2015 | Herbsleb | F03D 7/022 416/61 |
| 2017/0328346 A1 | 11/2017 | Hales | |
| 2018/0142674 A1 * | 5/2018 | Hammerum | F03D 7/045 |
| 2019/0178231 A1 * | 6/2019 | Tomas | F03D 17/00 |
| 2020/0056589 A1 * | 2/2020 | Evans | F03D 7/028 |
| 2020/0291922 A1 * | 9/2020 | Hovgaard | G05B 15/02 |
| 2020/0300227 A1 * | 9/2020 | Evans | F03D 17/00 |
| 2022/0307472 A1 * | 9/2022 | Hovgaard | F03D 7/0224 |
| 2022/0389906 A1 * | 12/2022 | Shartzer | F03D 7/048 |

FOREIGN PATENT DOCUMENTS

| | | | | |
|---|---|---|---|---|
| EP | 3862561 A1 | * | 8/2021 | ............ F03D 17/00 |
| EP | 4102060 A1 | * | 12/2022 | ............ F03D 17/00 |
| FR | 2976630 A1 | | 12/2012 | |
| FR | 2988442 A1 | | 9/2013 | |
| WO | 2020212119 A1 | | 3/2020 | |

* cited by examiner

[Fig 1]
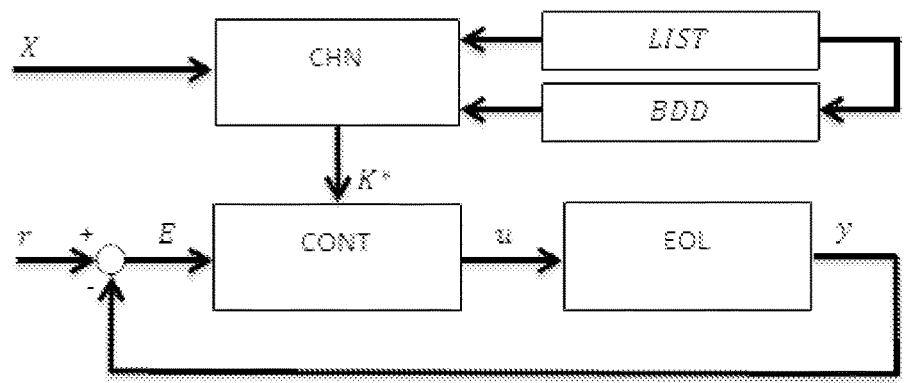
[Fig 2]
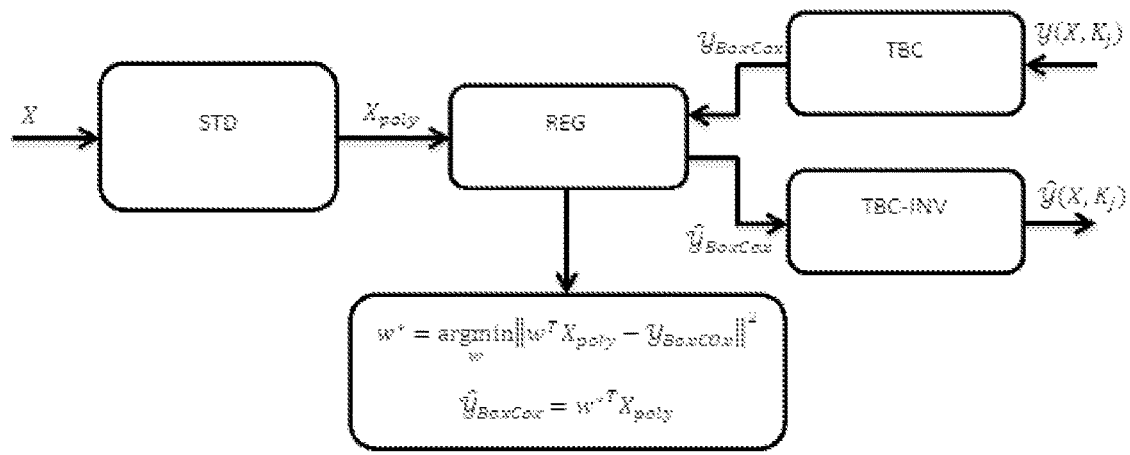
[Fig 3]
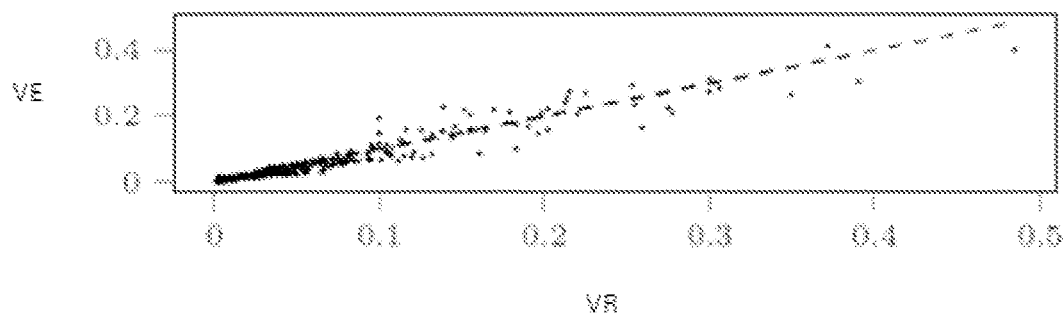

METHOD AND SYSTEM FOR CONTROLLING A QUANTITY OF A WIND TURBINE BY CHOOSING THE CONTROLLER VIA MACHINE LEARNING

CROSS REFERENCE TO RELATED APPLICATIONS

Reference is made to PCT/EP2020/058739 filed Mar. 27, 2020, designating the United States, and French Application No. 1904.071 filed Apr. 16, 2019, which are incorporated herein by reference in their entirety.

BACKGROUND OF THE INVENTION

Field of the Invention

The present invention relates to the field of wind turbine control, in particular to the control of the individual inclination angle or the individual pitch of at least one blade of a wind turbine.

Description of the Prior Art

A wind turbine allows the kinetic energy from the wind to be converted into electrical or mechanical energy. For conversion of wind to electrical energy, it is made up of the following elements:

a tower for positioning a rotor at a sufficient height to enable motion thereof (necessary for horizontal-axis wind turbines) or allowing the rotor to be positioned at a height enabling it to be driven by a stronger and more regular wind than at ground level. The tower generally houses part of the electrical and electronic components (modulator, control, multiplier, generator, etc.);

a nacelle mounted at the top of the tower, housing mechanical, pneumatic and some electrical and electronic components necessary to operate the turbine. The nacelle can rotate so as to orient the machine in the right direction;

a rotor fastened to the nacelle, comprising blades (generally three) and the hub of the wind turbine. The rotor is driven by the wind energy and it is connected by a mechanical shaft, directly or indirectly (via a gearbox and mechanical shaft system), to an electric machine (electric generator) that converts the energy recovered to electrical energy. The rotor is potentially provided with control systems such as variable-angle blades or aerodynamic brakes; and a transmission made up of two shafts (mechanical shaft of the rotor and mechanical shaft of the electrical machine) connected by a transmission (gearbox).

Since the early 1990s, there has been renewed interest in wind power, in particular in the European Union where the annual growth rate is about 20%. This growth is related to the inherent possibility for carbon-free electricity generation. Furthermore, in view of the objectives set during COP21, a net decarbonization of the energy should take place in the upcoming century. Wind energy appears as one of the most mature renewable energies for the upcoming energy transition, as evidenced by the growth of its installed power capacity, which should continue to increase for several more decades. The wind energy industry already represents several hundred billion euros and it should continue to grow, therefore a decrease in the wind energy production costs can enable savings of several hundred million or even billions of euros. In addition, in order to maximize energy production, the wind industry tends to increase the diameter of the rotor, which causes an increase in mechanical loads on the blades and the rotor. In order to sustain this growth, the energy yield of wind turbines still needs to be further improved. The prospect of wind power production increase requires developing effective production tools and advanced control tools in order to improve the performances of the machines. All wind turbines are therefore designed with a power regulation system.

For this power regulation, controllers have been designed for variable-speed aerogenerators. The purpose of the controllers is to maximize the electrical power recovered, to minimize the rotor speed fluctuations, and to minimize the fatigue and the extreme moments of the structure (blades, tower and platform).

Control of the variable-speed wind turbines has therefore been divided into three categories:

yaw control (control of the wind turbine orientation with respect to the wind)

generator torque control (maximization of the turbine power when the wind is below the nominal speed allowed by the turbine)

blade pitch control (regulation of the aerodynamic torque of the turbine when the wind is above the nominal value by inclination of the blades).

The blade control can itself be divided into two control strategy types, collective pitch control (CPC) where each blade has the same inclination angle and individual pitch control (IPC) where each blade has a different inclination angle. The main purpose of CPC is to control the aerodynamic torque of the wind turbine so as not to switch to overspeed, which may combine with an objective of controlling the thrust force on the rotor.

CPC considers an average wind passing through the rotor and therefore assumes that the wind is uniform over the surface of the rotor. This assumption is less and less true due to the constant increase in diameter of the rotors produced (which can be up to 200 m). IPC is notably described in the following documents:

Bossanyi, E. (2003). Individual Blade Pitch Control for Load Reduction. Wind. Energy, 119-128, Schlipf, D. (2010). Look-Ahead Cyclic Pitch Control Using LiDAR. The science of making torque from wind, Burton, T. (2011). Wind Energy Handbook., Lu, Q., Bowyer, R., & Jones, B. L. (2015). Analysis and Design of Coleman Transform-Based Individual Pitch Controllers for Wind-Turbine Load Reduction. Wind Energy, 1451-1468.

In these works, IPC is considered with the Coleman transform (Coleman, R. P., & Feingold, A. M. (1957). Theory of self-excited mechanical oscillations of helicopter rotors with hinged blades. National Advisory Committee for Aeronautics), which makes it possible to switch from the rotating reference frame of the blades to the fixed reference frame of the wind turbine hub. By means of this transformation, the out-of-plane moments on each blade are transformed into pitch and yaw moments on the hub, which reflects an imbalance of the aerodynamic loads on the wind turbine blades. Most often, IPC is used in addition to CPC (Burton, 2011; Bossanyi, 2003; Lu, Bowyer, & Jones, 2015; Schlipf, 2010), and the IPC controller gives an angle offset on each blade, such that the sum of the angle offsets is zero, which enables the IPC not to disturb proper CPC control (Burton, 2011). To date, a single controller jointly synthesizing CPC and IPC controls (Ranch, S., & Schlipf, D. (2014). Nonlinear model predictive control of floating wind turbines with individual pitch control. American Control Conference (ACC), (pp. 4434-4439)) has been proposed in the literature.

Assessing the service life or the fatigue of a wind turbine is a complex process because the signals resulting from simulations need to be analysed via a counting algorithm and by applying the Palmgren-Miner rule (Miner, M. (1945). Cumulative Damage. Fatigue Journal of Applied Mechanics), which relates the loading cycles to the consumed life fraction of the component. The count is not the result of a simple algebraic function, but of an algorithm known as rainflow counting (RFC (Downing & Socie, 1982)) algorithm. This counting makes the expression of fatigue discontinuous and non-integrable over time. On the other hand, several works have presented techniques for fatigue prediction as a function of the wind characteristics for a wind turbine with a given closed-loop controller (Dimitrov, N., & Kelly, M. (2018). From wind to loads: wind turbine site-specific load estimation using databases with high-fidelity load simulations. Wind Energy Science Discussions; Murcia, J., Réthoré, P., & Dimitrov, N. (2017). Uncertainty propagation through an aeroelastic wind turbine model using polynomial surrogates. Renewable Energy, 910-922). A study has shown that the winds that may be experienced by a wind farm can be grouped into different wind types (Clifton, A., & Schreck, S. (2013). Turbine Inflow Characterization at the National Wind Technology Center. Journal of Solar Energy Engineering). These wind types evolve as a function of the climate variations between day and night (due to the sunshine and temperature differences) and from day to day (due to the movements of air masses on the earth's surface). The characteristics of the wind therefore evolve slowly.

Furthermore, various control methods have been developed to improve energy recovery while limiting wind turbine fatigue. Fatigue could be used as an objective function in a conventional optimal control technique, but the specificities of the aforementioned fatigue calculation and counting algorithm used make this use very complex. In order to overcome this complexity, the fatigue is often approximated with integrals of quadratic functions; however, although the integral of a quadratic function allows the fatigue to be considered qualitatively, it does not allow it to be considered quantitatively (Knudsen, Bak & Svenstrup, 2015). It is important to consider the amount of fatigue on various elements of a wind turbine because it makes it possible to better weight the compromise between their fatigues. One work notably aimed at minimizing the fatigue by adapting the weights of a model predictive control MPC so that the quadratic cost function reflects the fatigue (Barradas & Wisniewski, 2016).

Among these control methods, patent application FR-2, 976,630 corresponding to U.S. Pat. No. 10,041,473 relates to a method for optimizing the electrical energy production of a horizontal-axis wind turbine, by performing a non-linear control of the blade orientation taking account of the system dynamics, while minimizing the mechanical impact on the structure. The impact is minimized by modifying the inclination angle of the blades in such a way that the aerodynamic force applied onto the nacelle leads to a zero speed at the tower top. The method notably relies on a physical model of the aerodynamic force.

Besides, patent application FR-2,988,442 corresponding to U.S. Pat. No. 9,458,826 relates to a method for controlling an inclination angle of the blades by carrying out the following steps:
a) determining an aerodynamic torque setpoint and a torque setpoint for the electrical machine allowing to maximize the recovered power, from wind speed, rotor speed and electrical machine speed measurements;
b) modifying at least one of the setpoints by subtracting therefrom a term proportional to a difference between the measured rotor speed and the measured electrical machine speed;
c) determining an inclination angle for the blades allowing the aerodynamic torque setpoint to be achieved; and
d) orienting the blades according to the inclination angle.

However, the methods described in the prior art are not entirely satisfactory in terms of control optimization by reducing the wind turbine fatigue, in particular for all wind conditions, notably because they do not consider the overall wind turbine fatigue reduction as an objective function.

SUMMARY OF THE INVENTION

In order to minimize the impact of wind on the fatigue of a wind turbine, the present invention relates to a method of controlling a quantity of a wind turbine by automated online selection of a controller that minimizes the wind turbine fatigue. The method therefore relies on an (offline constructed) database of simulations of a list of controllers, and on an online machine learning step for determining the optimal controller in terms of wind turbine fatigue. Thus, the method allows automatic selection of controllers online, based on a fatigue criterion, and to switch between the controllers according to the measured evolutions of wind condition.

The invention relates to a method of controlling a quantity of a wind turbine for which a list of controllers of the quantity of the wind turbine is available, wherein the following steps are carried out:
a) constructing a database offline by simulating, for each controller of the list and for plural wind data, a cost function representative of the fatigue of the wind turbine;
b) measuring wind data online;
c) determining online a controller of the list that minimizes the fatigue of the wind turbine for the measured wind data by machine learning from the database; and
d) controlling online the quantity of the wind turbine by use of the determined controller.

According to one embodiment, the plural controllers of the list are selected from among proportional integral PI controllers, and H∞ regulators with at least one of the different weighting functions, and linear quadratic regulators LQR with different weightings, and model predictive controls MPC with different weightings and LiDAR-based predictive controls.

According to one implementation, the machine learning is implemented by use of a regression method predicting the fatigue of the wind turbine for each controller of the list or by use of a method of classifying the controllers of the list that minimize the cost criterion according to the measured wind data.

Advantageously, the machine learning is implemented by use of a regression method by carrying out the following steps:
i) standardizing the measured wind data;
ii) performing a polynomial increase in the measured wind data; and
iii) performing a linear regression of the polynomially increased wind data by use of a change in space of the target value.

Alternatively, the machine learning is implemented by a regression method based on a random forest method, a neural network method, a support vector machine method or a Gaussian process method.

According to one aspect, the individual angle or the individual pitch of at least one blade of the wind turbine is controlled.

According to one option, the controllers of the list further take account for a regulation error between a setpoint for regulating the quantity of the wind turbine and a measurement of the quantity of the wind turbine.

According to a feature, the wind data used for constructing the database results from measurements on the site of the wind turbine.

According to one embodiment, the wind data used for constructing the database comes from a wind simulator.

Moreover, the invention relates to a system of controlling a quantity of a wind turbine using the control method according to one of the above features, the control system comprising means for storing the controller list and the database constructed by simulating for plural wind data a cost function representative of the fatigue of the wind turbine for each controller of the list, wind data measurement, means for determining a controller of the list that minimizes the fatigue of the wind turbine for the measured wind data by machine learning from the database, and means for controlling the quantity of the wind turbine.

BRIEF DESCRIPTION OF THE FIGURES

Other features and advantages of the method according to the invention will be clear from reading the description hereafter of embodiments given by way of non-imitative example, with reference to the accompanying figures wherein:

FIG. 1 illustrates the steps of the control method according to an embodiment of the invention;

FIG. 2 illustrates the regression machine learning step according to a variant embodiment of the invention; and FIG. 3 is a curve of the real and the estimated fatigue values for an example embodiment of the invention.

DETAILED DESCRIPTION OF THE INVENTION

The invention relates to a method of controlling a quantity of a wind turbine in order to minimize the fatigue of the wind turbine or of at least a part of the wind turbine (that is a wind turbine component) according to measured wind data. The method according to the invention is based on the selection of the optimal controller (in terms of fatigue) by machine learning. The principle develops a learning algorithm allowing construction of a map relating measured wind conditions to a mechanical fatigue quantity. One of the goals of the invention can be to create a substitution model for estimating the service life of the wind turbine in a wind farm with an almost instantly given wind distribution.

In the rest of the description, the expression "wind turbine fatigue" also designates the fatigue of at least one turbine component.

A wind turbine quantity is understood to be any parameter of the wind turbine that can be controlled. According to a preferred embodiment, the quantity can be the individual inclination angle or the individual pitch of the blades used in the individual pitch control TPC.

Wind data is understood to be information relative to the incoming wind. This wind data can be measured notably by a LiDAR (laser imaging, detection and ranging) sensor, an anemometer or a SODAR (sonic detection and ranging) sensor, etc. By way of non-limitative example, wind data can notably comprise the following information: mean and standard deviation of the rotor averaged wind speed, horizontal and vertical gradients of the rotor averaged wind speed, pitch and yaw misalignments, rotor averaged wind turbulence intensity.

In order to select the optimal turbine quantity control, the method is based on the use of a predetermined list of a plural controllers (at least two controllers). Using plural controllers provides control adaptability to different wind conditions and it therefore enables optimal control whatever the wind conditions. The plural controllers of the list can be selected from among proportional integral PI controllers, and/or H∞ D regulators with different weighting functions, and at least one of linear quadratic regulators LQR, and model predictive controls MPC and/or LiDAR-based predictive controls with different weightings. The controller list can comprise controllers of the same type, that is several differently parametrized controllers.

The method according to the invention can then combine three aspects: control of a quantity of the wind turbine (individual blade control for example), wind characteristics that evolve slowly and turbine fatigue prediction. Substitution model techniques for fatigue can be used to predict a cost for the wind turbine subjected to the current wind for different controllers of a discrete set. This enables automatic online selection of the controllers, based on a fatigue criterion, and control of the wind turbine quantity by switching between controllers according to the wind condition evolutions.

The method according to the invention comprises the following steps:
1) database construction;
2) wind data measurement;
3) determining the controller by machine learning; and
4) controlling the wind turbine quantity.

Step 1) is carried out offline beforehand to limit the duration of the online control process. Moreover, the highest calculation cost of the method according to the invention is thus related to a step carried out offline.

Steps 2) to 4) are carried out online during operation of the wind turbine for real-time selection of the controller.

FIG. 1 schematically illustrates, by way of non-limitative example, the steps of the method according to one embodiment of the invention. A list LIST of controllers of the wind turbine quantity is determined beforehand. From this controller list LIST, and by use of simulations, database BDD representative of the turbine fatigue is constructed offline for the controllers of list LIST and for wind data. Wind data X is measured online. This measured wind data X, controller list LIST and database BDD are then used by a high-level controller CHN to determine, online, a controller K* of list LIST that minimizes the turbine fatigue for the measured wind data X. This determination of controller K* is performed by machine learning.

The determined controller K* is then used for online control CONT of the wind turbine quantity. In the embodiment illustrated, control CONT is carried out by considering a regulation error E corresponding to the difference between the regulation setpoint r of the turbine quantity and a measurement y of the turbine quantity y. Control CONT then generates a control signal u (an individual blade pitch for example) for wind turbine EOL. According to an embodiment option, regulation setpoint r can be, in most cases, zero so that the control, notably control IPC, can regulate the loads that unbalance the wind turbine to 0. In a variant, notably in the case of floating wind turbines, setpoint r can be given by an external controller for stabilizing and/or balancing the turbine.

The steps of the control method are detailed in the rest of the description.

1. Database Construction

In this step, a database is constructed offline by simulating, for each controller of the predetermined list and for a plural wind data, a cost function representative of the wind turbine fatigue.

According to one embodiment of the invention, the plural wind data used for this step can be obtained by use of preliminary measurements on the wind turbine site. Thus, the database will be as representative as possible.

Alternatively, the plural wind data used for this step can be obtained by a wind simulator, for example the TurbSim™ software (NREL, National Renewable Energy Laboratory), which is a stochastic full-field turbulence simulator.

Simulation of the turbine behavior can be performed by a numerical simulator, for example an aeroelastic wind turbine simulator such as the FAST™ software (NREL, National Renewable Energy Laboratory).

A cost criterion J, whose complexity is not a limitation since it is assessed offline, is then designed. Typically, it is possible to use complex fatigue models of the mechanical elements of the turbine in order to have a cost criterion true to the damage undergone by the turbine. These models are most often not usable online because a rather long time series is necessary to evaluate the fatigue with these models. Thus, one advantage of the method according to the invention is that it can use complex turbine fatigue cost models that cannot be used directly online.

According to an implementation of the invention, the fatigue model can be a Palmgren-Miner model that counts the number of loading and unloading hysteresis loops. This counting may be discontinuous. Preferably, the counting method can be the rainflow counting method RFC. These counting methods do not allow fatigue to be expressed as the integral of an algebraic loading function, which is conventionally used in optimal control (cost of the integrals of quadratic functions). The integral of a quadratic cost function does not enable evaluation of the number of fatigue cycles, which is a problem when a compromise is to be assessed between the fatigues of various elements. One of the main advantages of the method according to the invention is to make it possible to integrate the fatigue calculation in the global control strategy.

Each simulation is evaluated with the previously designed cost criterion J. Thus, the simulation of the wind turbine subjected to the wind i, denoted by in a closed loop with controller $K_j$ belonging to the list $K_{list}$, has a cost $y_{ij}=J(w_i, K_j)$. On the other hand, in order to reduce the number of variables and to simplify the problem, it is possible to extract from the wind measurements characteristics capable of unequivocally characterizing wind woo and which could be correlated with the value of the cost criterion. Function g giving, from wind the wind characteristic vector $X_i = g(w_i)$ can then be defined.

2. Wind Data Measurement

In this step, the wind data is measured online to know the incoming wind in real time.

According to one embodiment, these measurements can be carried out by a LiDAR sensor.

3. Determining the Controller by Machine Learning

This step determines online the optimal controller in terms of wind turbine fatigue for the wind data measured in the previous step. The controller is determined from among the controller list by machine teaming using the database constructed in step 1) and the wind data measurements of step 2), as well as the controller list.

According to one implementation of the invention, two ways of combining the data and machine learning for selecting the controllers can be considered: cost prediction via regression techniques (one regression per controller in the list) and classification of the controllers that minimize the cost criterion according to the current wind (measured wind data).

According to a first embodiment, the regression can reconstruct the map $J(w_i, K_j) = \mathcal{Y}(g(w_i), K_j) = \mathcal{Y}(X_i, K_j)$ with a function $f_{reg}$ such that:

$$f_{reg} = \operatorname*{argmin}_{\tilde{f}} \sum_i \sum_j \|\tilde{f}(X_i, K_j) - y(X_i, K_j)\|$$

where Y is a map associating wind characteristic vector $X_i$ and controller $K_j$ with the corresponding cost, $\tilde{f}$ defines a class of functions whose parameters are to be optimized so as to minimize the difference between the predictions of the model and the map. Function $f_{reg}$ predicts the value of the cost criterion for the wind turbine in a closed loop with each controller of the list under the current wind (measured wind data). It is thus possible to select the controller K* that is best suited for the current wind conditions X (measured wind data), by taking the controller that minimizes the cost criterion according to function $f_{reg}$:

$$K^*(X, f_{reg}, K_{list}) = \operatorname*{argmin}_{K_j \in K_{list}} f_{reg}(X, K_j)$$

According to a second embodiment, the regression can comprise the following steps:

i) standardizing the measured wind data;
ii) performing a polynomial increase in the measured wind data; and
iii) performing a linear regression of the polynomially increased wind data by use of a change in space of the target value.

Standardization of the wind data allows the measured wind data to be brought to a centered normal law.

The polynomial increase corresponds to multiplying together the coordinates of the wind data vector up to a certain predefined degree. For example, data (x1, x2, x3) can be converted to (1, x1, x2, x3, x1x2, x1x3, x2x3, x12, x22, x32) for a polynomial increase of degree 2.

The space change of the target value can be a Box-Cox transformation allow adding a non-linearity at the output. In statistics, the Box-Cox transformation is a family of functions applied to create a monotonic transformation of data using power functions. Such a transformation allows stabilizing the variance, to make the data closer to a normal type distribution and to improve the measurement validity.

According to a third embodiment, the regression can be based on a random forest method, a neural network method, a support vector machine (SVM) method or a Gaussian process method.

According to one aspect of the invention, classification of the controllers can directly synthesize a function $f_{cl}$ predicting the controller best suited for the current wind condition X, denoted by $K^+ = f_{cl}(X)$. Function $f_{cl}$ can be defined as follows:

$$f_{cl} = \operatorname*{argmin}_{\tilde{f}} \sum_i h\left(\tilde{f}(X_i), \operatorname*{argmin}_{K_j \in K_{list}} y(X_i, K_j)\right)$$

where function h provide a good classification of the controller:

$$h(K_a, K_b) = \begin{cases} 1 & \text{if } K_a \neq K_b \\ 0 & \text{otherwise} \end{cases}$$

According to the initial results, the two methods (regression and classification) seem to be equivalent. It is noted that, according to the classification technique used, regression of a pseudo cost function (fatigue) can be performed. This cost function is the probability that a controller K is the most suitable controller under a wind condition X, denoted by p(X,K). Finally, the result of $f_{cl}$ is the controller that maximizes this probability under a wind condition.

Regression has the advantage of predicting the (fatigue) cost directly. It is therefore possible to determine a threshold for controller switch and to limit switching from one controller to another only to the switches providing a net gain. Classification has the advantage of directly minimizing the classification error, and thus limiting risk of taking the wrong controller when selecting the most suitable controller.

4. Controlling the Wind Turbine Quantity

This step controls online the wind turbine quantity by applying the controller determined in step 3).

According to an embodiment corresponding to FIG. 1, the controller is applied in the feedback loop. The controller accounts for the regulation error between a regulation setpoint and the turbine quantity measurement. In this case, the method can comprise a step of measuring the controlled wind turbine quantity.

Furthermore, the present invention relates to a system of controlling a wind turbine quantity, capable of implementing the method according to any one of the variant combinations described.

The control system comprises at least:
- means for storing the controller list and the database constructed by simulation;
- means for wind data measurement;
- means for determining a controller, which uses the controller list and the database of the means for storage and the wind data measurements of the means for measuring; and
- control means for applying the determined controller to the wind turbine.

According to one embodiment of the invention, the means for deter mining a controller and the means for storing can be a computer.

Moreover, the control system may comprise a numerical simulation computer for constructing the database.

The advantage of using the method according to the invention rather than conventional optimal control methods also intended to minimize a cost criterion is that significant latitude is provided to the cost criterion. Indeed, the method according to the invention allows any cost criterion to be used. It is therefore possible to use precise mechanical fatigue models that can only be used offline, unlike the conventional MPC (Model Predictive Control) models that require that the cost criterion can be continuously re-evaluated online.

The second advantage is that the method according to the example can allow optimizing the control over a very complex cost function using relatively simple control techniques, thereby having a very low online calculation cost. Furthermore, the control method according to the invention is intrinsically designed to adapt to various wind conditions, unlike most other control techniques based on linear models, which require an additional work of generalization to the different cases encountered by the wind turbine.

Example

Other features and advantages of the control method according to the invention will be clear from reading the description of the example hereafter.

In order to validate the control method according to the invention, the method was first tested with a wind data set generated by the TurbSim™ wind generator and simulated in closed loops on the FAST™ aeroelastic wind turbine simulator, with 4 controllers. The controllers considered are proportional integral (PI) IPC controllers corresponding to the one described in Bossanyi et al. (Bossanyi, 2003). For this example, a CPC controller mentioned in Jonkman et al. (Jonkman, 2007) provides good regulation of the rotor speed and power. A PI controller gives, from the regulation error between the measurement and the desired value ε(t), defined as the difference between the measured quantity to be regulated and the regulation setpoint, the input for the system to be regulated u(t) as follows:

$$u(t) = \int_{t_0}^{t} K_I \varepsilon(\tau) d\tau + K_p \varepsilon(t)$$

where $K_p$ and $K_I$ are the proportional and integrator coefficients that define the controller. The parameters of the 4 PI controllers considered in the example are:

TABLE 1

| Controller | $K_p$ | $K_I$ |
|---|---|---|
| 1 | $4 \cdot 10^{-5}$ | $3.2889 \cdot 10^{-5}$ |
| 2 | $4 \cdot 10^{-5}$ | $5.1556 \cdot 10^{-5}$ |
| 3 | 0.086 | 0.0031 |
| 4 | 0.0186 | 0.0066 |

The winds used to create the database (learning data) are non-uniform three-dimensional wind fields with coherent turbulences. For the learning data, 588 winds were generated with 147 combinations of parameters (average speed, direction, vertical speed gradient, turbulence intensity).

To be able to predict fatigue as a function of wind, the characteristics allowing to explain the fatigue that could be obtained from wind reconstruction algorithms need to be extracted from the wind.

From the TurbSim™ wind fields, the wind vector $\vec{V}(t, y, z) = [u(t, y, z), v(t, y, z), w(t, y, z)]^T$ is obtained at the time t in the rotor plane where y and z are the horizontal and vertical coordinates of the field respectively. Let V be the norm $L_2$ of vector $\vec{V}(t, y, z)$.

The wind characteristics considered are the average and the standard deviation over the simulation time (300 seconds), starting at t0 and ending at tf, of the rotor averaged wind speed RAWS, of the horizontal and vertical gradients denoted by δy and δz, and of the pitch and yaw misalignments denoted by $\theta_y$ and $\theta_z$. Finally, the rotor averaged turbulence intensity RATI is calculated for each simulation. The instantaneous values of RAWS, δy, δz, $\theta_y$ and $\theta_z$, as well as the value for the entire simulation of RATI are mathematically expressed as follows:

$$RAWS = \frac{1}{S} \int_S V ds$$

-continued $$\delta_y(t) = \frac{1}{S}\int_S \frac{\partial V}{\partial y}ds$$

$$\delta_z(t) = \frac{1}{S}\int_S \frac{\partial V}{\partial z}ds$$

$$\theta_y(t) = \frac{1}{S}\int_S \tan^{-1}\frac{w}{u}ds$$

$$\theta_z(t) = \frac{1}{S}\int_S \tan^{-1}\frac{v}{u}ds$$

$$RATI = \frac{1}{S}\int_S \frac{\int_{t_0}^{t_f} V^2 dt - \left(\int_{t_0}^{t_f} Vdt\right)^2}{\int_{t_0}^{t_f} Vdt}ds$$

with S the rotor area and ds=dydz an infinitesimal surface of the rotor.

In this example, the machine learning function $f$ has the following structure, illustrated in FIG. 2 (by way of non-(imitative example):

standardization STD of data X (distribution brought to a centered normal law) polynomial increase (multiplying together the coordinates of the vector up to a certain degree)
(e.g. $(x_1, x_2, x_3) \to (1, x_1x_2, x_1x_3, x_2x_3, x_1^2, x_2^2, x_3^2)$ for a polynomial increase of degree 2). In the present case, the x are the wind characteristics. We then obtain data $X_{poly}$ linear regression REG from data $X_{poly}$ Box-Cox transformation TBC of the target value (Box & Cox, 1964), which allows a non-linearity to be added at the output $$y_{BoxCox} = \frac{1}{\lambda}(y^\lambda - 1)$$

reverse Box-Cox transformation TBC-INV allowing to calculate the fatigue prediction.

w* is a vector which results from the optimization of these coefficients so as to minimize the difference between the predictions and the map in the Box-Cox space. The equation of $\hat{y}$ shows how w* is used to predict the cost in the Box-Cox space from $X_{poly}$.

This regression scheme is performed for each controller $K_j$, and all these regressions give function $f$. We can therefore write: $f(X, K_j) = \hat{y}(X, K_j)$.

The first tests show that the substitution model of the cost evaluation procedure actually allows to predict the cost correctly on test data not used during learning (database construction). The regression algorithm has learned on a randomly drawn set without redelivery of 294 winds, 4 regressions were obtained, one for each controller.

The algorithm is tested on 294 randomly drawn wind samples, without redelivery, not used for learning (database). FIG. 3 shows the real values VR and the estimated values VE obtained with the method according to the invention. It is possible to see in FIG. 3 that the algorithm predicts the cost of each simulation correctly, and the predictions are represented here for the four simulations.

To evaluate the quality of the method according to the invention, two indicators can be used:

$$R^2(K) = 1 - \frac{var(y(K) - \hat{y}(K))}{var(y(K))}$$

$$R_{dec}(K) = 1 - \frac{\sum_i y(K^*, X_i)}{\min_K \sum_i (K, X_i)}$$

$R^2$ gives an indication of the regression algorithm quality, the closer it is to 1, the higher the quality of the regression. $R_{dec}$ gives an approximation of the fatigue decrease that could be obtained using the best controllers K* determined by the regression, without accounting for the cost that could be added by switching from one controller to another.

Table 2 gives the values of the indicators. Scores $R^2$ are above 0.9 for each regression. Therefore, the regression method is of good quality. According to scores $R_{dec}$, the algorithm could indeed allow reduction of the wind turbine cost by at least 20% in relation to the best controller of the set of candidates alone.

TABLE 2

| Controller | $R^2$ | $R_{dec}$ |
|---|---|---|
| 1 | 0.93 | 23% |
| 2 | 0.96 | 35% |
| 3 | 0.93 | 36% |
| 4 | 0.92 | 26% |

The invention claimed is:

1. A method of controlling a quantity of a wind turbine for which a list of plural controllers of the quantity of the wind turbine is available, comprising steps of:
   a) constructing a database offline by simulating, for each controller of the list and for plural wind data, a cost function representative of fatigue of the wind turbine;
   b) measuring wind data online;
   c) determining online a controller from the list that minimizes fatigue of wind turbine for the measured wind data by machine learning from the database; and
   d) controlling online the quantity of the wind turbine by use of the determined controller.

2. A control method as claimed in claim 1, wherein the plural controllers of the list are selected from among proportional integral PI controllers, at least one of H∞ regulators with different weighting functions, and linear quadratic regulators with different weightings, and model predictive controls with different weightings and LiDAR-based predictive controls.

3. A control method as claimed in claim 2, wherein the machine learning is implemented by a regression method predicting the fatigue of the wind turbine for each controller of the list or by use of a method of classifying the controllers of the list that minimizes cost criterion according to the measured wind data.

4. A control method as claimed in claim 3, wherein the machine learning is implemented by use of a regression method carrying out steps of:
   i) the measured wind data;
   ii) performing a polynomial increase in the measured wind data; and
   iii) performing a linear regression of the polynomially increased wind data by use of a change in space of a target value.

5. A control method as claimed in claim 3, wherein the machine learning is implemented by use of a regression method based on a random forest method, a neural network method, a support vector machine method or a Gaussian process method.

6. A control method as claimed in claim 3, wherein an individual angle or the individual pitch of at least one blade of the wind turbine is controlled.

7. A control method as claimed in claim 3, wherein the wind data used for constructing the database is provided by a wind simulator.

8. A control method as claimed in claim 2, wherein an individual angle or the individual pitch of at least one blade of the wind turbine is controlled.

9. A control method as claimed in claim 2, wherein the wind data used for constructing the database is provided by a wind simulator.

10. A control method as claimed in claim 1, wherein the machine learning is implemented by a regression method predicting the fatigue of the wind turbine for each controller of the list or by use of a method of classifying the controllers of the list that minimizes cost criterion according to the measured wind data.

11. A control method as claimed in claim 10, wherein the machine learning is implemented by use of a regression method carrying out steps of:
 i) the measured wind data;
 ii) performing a polynomial increase in the measured wind data; and
 iii) performing a linear regression of the polynomially increased wind data by use of a change in space of a target value.

12. A control method as claimed in claim 11, wherein the wind data used for constructing the database is provided by a wind simulator.

13. A control method as claimed in claim 10, wherein the machine learning is implemented by use of a regression method based on a random forest method, a neural network method, a support vector machine method or a Gaussian process method.

14. A control method as claimed in claim 10, wherein an individual angle or the individual pitch of at least one blade of the wind turbine is controlled.

15. A control method as claimed in claim 10, wherein the wind data used for constructing the database is provided by a wind simulator.

16. A control method as claimed in claim 1, wherein an individual angle or the individual pitch of at least one blade of the wind turbine is controlled.

17. A control method as claimed in claim 1, wherein the controllers of the list further account for a regulation error between a setpoint for regulating the quantity of the wind turbine and a measurement of the quantity of the wind turbine.

18. A control method as claimed in claim 1, wherein the wind data used for constructing the database results from measurements on the site of the wind turbine.

19. A control method as claimed in claim 1, wherein the wind data used for constructing the database is provided by a wind simulator.

20. A system for controlling a quantity of a wind turbine using the control method as claimed in claim 1, the control system comprising means for storing the controller list and the database constructed by simulating for plural wind data a cost function representative of fatigue of the wind turbine for each controller of the list, means for measuring wind data, means for determining a controller of the list that minimizes fatigue of the wind turbine for the measured wind data by machine learning from the database, and for controlling the quantity of the wind turbine.

* * * * *